(12) United States Patent
Takahashi et al.

(10) Patent No.: US 11,860,075 B2
(45) Date of Patent: Jan. 2, 2024

(54) ANALYZING METHOD AND ANALYZING APPARATUS FOR UREA

(71) Applicant: ORGANO CORPORATION, Tokyo (JP)

(72) Inventors: Kazushige Takahashi, Tokyo (JP); Hiroshi Sugawara, Tokyo (JP); Fumio Sudo, Tokyo (JP); Katsuhisa Shimada, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 292 days.

(21) Appl. No.: 16/765,990

(22) PCT Filed: Oct. 30, 2018

(86) PCT No.: PCT/JP2018/040321
§ 371 (c)(1),
(2) Date: May 21, 2020

(87) PCT Pub. No.: WO2019/107045
PCT Pub. Date: Jun. 6, 2019

(65) Prior Publication Data
US 2020/0355586 A1    Nov. 12, 2020

(30) Foreign Application Priority Data

Nov. 28, 2017 (JP) .................. 2017-227724
Apr. 11, 2018 (JP) .................. 2018-076058

(51) Int. Cl.
*G01N 1/40* (2006.01)
*B01D 15/36* (2006.01)
(Continued)

(52) U.S. Cl.
CPC ......... *G01N 1/4005* (2013.01); *B01D 15/361* (2013.01); *B01D 61/025* (2013.01);
(Continued)

(58) Field of Classification Search
CPC ........ G01N 1/4005; G01N 1/10; G01N 21/78; G01N 2001/4011; G01N 2001/4016;
(Continued)

(56) References Cited

U.S. PATENT DOCUMENTS 3,427,225 A * 2/1969 Harvill ..................... C12Q 1/58
435/12
3,530,040 A * 9/1970 Hendershot .............. C12Q 1/58
435/12
(Continued)

FOREIGN PATENT DOCUMENTS

CN    104122346 A    10/2014
CN    104142373 A    11/2014
(Continued)

OTHER PUBLICATIONS

Full English Translatio of Document JP4159250, Published Oct. 2008. (Year: 2008).*
(Continued)

*Primary Examiner* — Joseph W Drodge
(74) *Attorney, Agent, or Firm* — Greenblum & Bernstein, P.L.C.

(57) ABSTRACT

The analyzing method for quantifying urea in a sample solution includes: a pretreatment step of pretreating the sample solution with at least one of a membrane device including a reverse osmosis membrane and an ion exchange device including an ion exchanger; and an analyzing step of analyzing a target substance in the pretreated sample solution. The analyzing step is based on, for example, flow injection analysis (FIA), and includes a step of quantifying the target substance by measuring the absorbance of a liquid containing a substance generated by reacting the target substance with a reagent.

14 Claims, 4 Drawing Sheets

(51) Int. Cl.
  *B01D 61/02* (2006.01)
  *C02F 1/42* (2023.01)
  *C02F 1/44* (2023.01)
  *G01N 21/78* (2006.01)
  *G01N 1/10* (2006.01)
  *C02F 101/38* (2006.01)

(52) U.S. Cl.
  CPC .............. *C02F 1/42* (2013.01); *C02F 1/441* (2013.01); *G01N 1/10* (2013.01); *G01N 21/78* (2013.01); *B01D 2311/2623* (2013.01); *C02F 2101/38* (2013.01); *G01N 2001/4011* (2013.01); *G01N 2001/4016* (2013.01)

(58) Field of Classification Search
  CPC .. G01N 35/085; G01N 35/1097; G01N 31/00; G01N 31/22; G01N 1/40; G01N 1/405; G01N 35/1095; G01N 1/34; B01D 15/361; B01D 61/025; B01D 2311/2623; B01D 2311/06; B01D 61/02; B01D 15/363; B01D 61/04; B01D 61/20; B01D 2311/04; C02F 1/42; C02F 1/441; C02F 2101/38; C02F 1/008; C02F 1/44; C02F 2001/422; C02F 2209/00; C02F 2209/003; C02F 2209/03; C02F 2209/34; B01L 2200/0631; B01L 2200/16; B01L 2400/0644
  See application file for complete search history.

(56) References Cited

U.S. PATENT DOCUMENTS

| | | | | |
|---|---|---|---|---|
| 3,567,374 A * | 3/1971 | Wybenga | ............... | G01N 33/62 436/108 |
| 3,890,099 A * | 6/1975 | Jung | ............... | G01N 33/62 436/108 |
| 4,188,292 A * | 2/1980 | Fitzgibbons | ............... | C02F 1/66 210/668 |
| 4,543,337 A * | 9/1985 | Klotzsch | ............... | G01N 33/62 436/108 |
| 4,581,141 A * | 4/1986 | Ash | ............... | A61M 1/3687 210/502.1 |
| 7,059,206 B1 * | 6/2006 | Kingston | ............... | G01N 33/18 73/863.23 |
| 2001/0047963 A1 | 12/2001 | Morita et al. | | |
| 2003/0159947 A1 * | 8/2003 | Tajiri | ............... | G01N 31/002 204/408 |
| 2004/0115829 A1 * | 6/2004 | Kaartinen | ............... | G01N 1/38 436/180 |
| 2006/0040280 A1 * | 2/2006 | Lee | ............... | B01D 15/00 435/6.15 |
| 2009/0266764 A1 * | 10/2009 | Kawakatsu | ............... | B01D 61/025 568/679 |
| 2013/0032532 A1 * | 2/2013 | Arai | ............... | C02F 3/107 210/615 |
| 2013/0048558 A1 * | 2/2013 | Arai | ............... | C02F 9/00 210/615 |
| 2013/0105389 A1 * | 5/2013 | Arai | ............... | C02F 9/00 210/610 |
| 2013/0213890 A1 * | 8/2013 | Kelly | ............... | A61M 1/1696 210/101 |
| 2013/0292267 A1 * | 11/2013 | McNeel | ............... | G01N 27/423 204/406 |
| 2013/0292330 A1 * | 11/2013 | Arai | ............... | C02F 3/302 210/610 |
| 2014/0190876 A1 * | 7/2014 | Meyer | ............... | A61M 1/3472 210/85 |

FOREIGN PATENT DOCUMENTS

| | | | | |
|---|---|---|---|---|
| EP | 3914 A2 * | 2/1979 | ............. | A61M 1/03 |
| JP | 62-70734 | 4/1987 | | |
| JP | 02-085760 A | 3/1990 | | |
| JP | 8-192154 | 7/1996 | | |
| JP | 2000-281638 | 10/2000 | | |
| JP | 2000-338099 | 12/2000 | | |
| JP | 2004-077299 | 3/2004 | | |
| JP | 2006-322777 A | 11/2006 | | |
| JP | 4159250 B2 * | 7/2008 | ............. | A61M 1/14 |
| JP | 2009-257773 | 11/2009 | | |
| TW | 200415351 | 8/2004 | | |
| TW | I231862 B | 5/2005 | | |
| WO | WO2003080225 A1 * | 10/2003 | ............. | B01D 61/00 |
| WO | WO2005108958 A1 * | 11/2005 | ............. | G01N 21/35 |
| WO | WO2005123938 A1 * | 12/2005 | ............. | G01N 33/543 |
| WO | 2016/132798 A1 | 8/2016 | | |
| WO | 2018/186104 | 10/2018 | | |

OTHER PUBLICATIONS

Office Action issued in corresponding Taiwanese Patent Application No. 107141141 dated Oct. 4, 2021, along with English translation thereof.

Hu, Xincheng et al., "Determination of Trace Amounts of Urea by Using Flow Injection With Chemiluminescence Detection", Analyst, vol. 119, No. 8, 1994, pp. 1829-1833.

"Standard Methods of Analysis for Hygienic Chemists", Pharmaceutical Society of Japan, Annotation 1990, Appendix (1995), 1995, pp. 1028, 1995, in Japanese, and a partial English language translation thereof.

International Search Report issued in International Patent Application No. PCT/JP2018/040321, dated Feb. 5, 2019.

Office Action issued in the corresponding Chinese Patent Application No. 201880075916.X dated Feb. 7, 2022, along with English Translation thereof.

Office Action issued in Japanese Patent Application No. 2017-227724 dated Aug. 23, 2021 , along with English translation thereof.

Office Action issued in Korean Patent Application No. 10-2020-7017787 dated Sep. 28, 2021 , along with English translation thereof.

Office Action Issued in Corresponding CN Patent Application No. 201880075916.X, dated Oct. 17, 2022, along with an English translation thereof.

* cited by examiner

ANALYZING METHOD AND ANALYZING APPARATUS FOR UREA

TECHNICAL FIELD

The present invention relates to an analyzing method and an analyzing apparatus suitable for quantifying urea in a sample solution.

BACKGROUND ART

There is a need to accurately analyze and quantify trace amounts of urea in water. For example, when pure water is produced from raw water by a pure water production system, it is difficult to remove or eliminate remove urea in the raw water by an ion exchange apparatus and an ultraviolet oxidation apparatus constituting the pure water production system, and therefore, it is necessary to supply raw water from which urea has been removed in advance to the pure water production system. As a method of removing urea, there is known a method of selectively oxidizing urea by hypobromous acid by adding a chemical agent for producing hypobromous acid to raw water, but since the chemical agent for producing hypobromous acid also becomes a load on a pure water production system, it is preferable that the input amount of the chemical agent be small if it is small. Therefore, it is desired to determine the need for urea treatment by quantifying the urea concentration in the raw water, and to input an appropriate chemical agent when the treatment is necessary. In addition, there is a need to measure the urea concentration in pure water obtained from a pure water production system.

As a method for quantifying urea, a quantification method based on a colorimetric method using diacetyl monoxime, for example, a method described in "Hygiene test method" [Non-Patent Literature 1], and the like are well known. In the colorimetric method using diacetyl monoxime, other reagents can be used in combination for the purpose of promoting the reaction or the like. Examples of reagents used in combination for the purpose of promoting the reaction include: a solution of antipyrine and sulfuric acid; an aqueous solution of semicarbazide hydrochloride; an aqueous solution of manganese chloride and potassium nitrate; a solution of sodium dihydrogen phosphate and sulfuric acid; and the like. When antipyrine is used in combination, diacetyl monoxime is dissolved in an acetic acid solution to prepare an acetic acid solution of diacetyl monoxime, antipyrine (1,5-dimethyl-2-phenyl-3-pyrazolone) is dissolved in, for example, sulfuric acid to prepare an antipyrine-containing reagent solution, the acetic acid solution of diacetyl monoxime and the antipyrine-containing reagent solution are mixed successively into sample water, absorbance in the vicinity of a wavelength of 460 nm is measured, and quantitation is performed by comparison with a standard solution.

The quantification method of urea by means of the colorimetric method using diacetyl monoxime is intended to quantify the urea in the water of swimming pools and public baths, for example, and therefore, the sensitivity is poor for quantifying the urea in raw water or the like supplied to a pure water manufacturing process. Therefore, Patent Literature 1 discloses a method of continuously quantifying urea on-line in sample water in a concentration range of ppb or less to several ppm in order to continuously monitor the concentration of a trace amount of urea in the sample water by means of measuring the absorbance by applying flow injection analysis while being based on a colorimetric method using diacetyl monoxime.

Here, the flow injection analysis will be described. In the flow injection analysis, a continuous stream of liquid is formed in a thin tube into which a sample solution is injected to cause a reaction with a reagent, and the concentration of a reaction product or the like is measured at the end portion of the tube. The thin tube where reaction takes place is commonly referred to as a reaction coil. Such a flow injection analysis is widely used for quantitative analysis or the like of various target substances in a sample solution, in addition to the above-mentioned quantification of urea concentration.

CITATION LIST

Patent Literature

[Patent Literature 1] JP 2000-338099A

Non Patent Literature

[Non-Patent Literature 1] "Hygiene test method, Annotation 1990, Appendix (1995)", edited by the Pharmaceutical Society of Japan, 4.1.2.3(13)1, p. 1028, 1995

SUMMARY OF INVENTION

Technical Problem

When urea in a sample solution is used as a target substance by a quantitative method such as flow injection analysis, stable quantitation may not be possible. For example, when a trace amount of urea in the sample water is quantified by the method described in Patent Literature 1, it may not be possible to stably quantify urea depending on the sample water, and sometimes a result as if urea is contained in the sample water which has already been known not to contain urea may be obtained.

It is an object of the present invention to provide an analyzing method and apparatus capable of stably quantifying urea in a sample solution.

Solution to Problem

The analyzing method according to the present invention is an analyzing method of quantifying urea in a sample solution, the method including: a pretreatment step of pretreating a sample solution with at least one of a membrane device including a reverse osmosis membrane and an ion exchange device including an ion exchanger; and an analyzing step of quantifying urea in the pretreated sample solution.

The analyzing apparatus of the present invention is an analyzing apparatus for quantifying urea in a sample solution, wherein the analyzing apparatus includes: pretreatment means for pretreating a sample solution; and analyzing means for quantifying urea in the pretreated sample solution, and wherein the pretreatment means comprises at least one of a membrane device including a reverse osmosis membrane and an ion exchange device including an ion exchanger.

Advantageous Effect of Invention

According to the present invention, it is possible to stably quantify urea in a sample solution.

EMBODIMENT FOR CARRYING OUT THE INVENTION

Next, embodiments of the present invention will be described with reference to the drawings. First, the knowledge obtained by the present inventors in completing the present invention will be described. As a detection method in the flow injection analysis, measurement of absorbance at a specific wavelength corresponding to a reagent to be used and a target substance is widely performed, but the present inventors have found that some interfering substance in a sample solution may react with the reagent and a component generated by the reaction may interfere with the absorbance measurement, and that interference to the absorbance measurement can be suppressed by treating the sample solution with an ion exchanger.

Furthermore, the present inventors have found that organic nitrogen compounds such as humic substances contained in the sample water become interfering substances when the quantification of urea is performed, and that these interfering substances can be removed by a reverse osmosis membrane device having a reverse osmosis membrane or an ion exchange device having an ion exchanger. For example, when the quantification of urea is performed based on a colorimetric method using diacetyl monoxime, the absorbance near the wavelength of 460 nm is measured, but organic nitrogen compounds such as humic substances also have absorption near the wavelength of 460 nm, which are considered to be interfering substances in the quantification of urea. Since urea itself is also an organic nitrogen compound, urea is not included when it is referred to as an organic nitrogen compound as an interfering substance in this Description when urea is used as a target substance for analysis.

Figure 1:
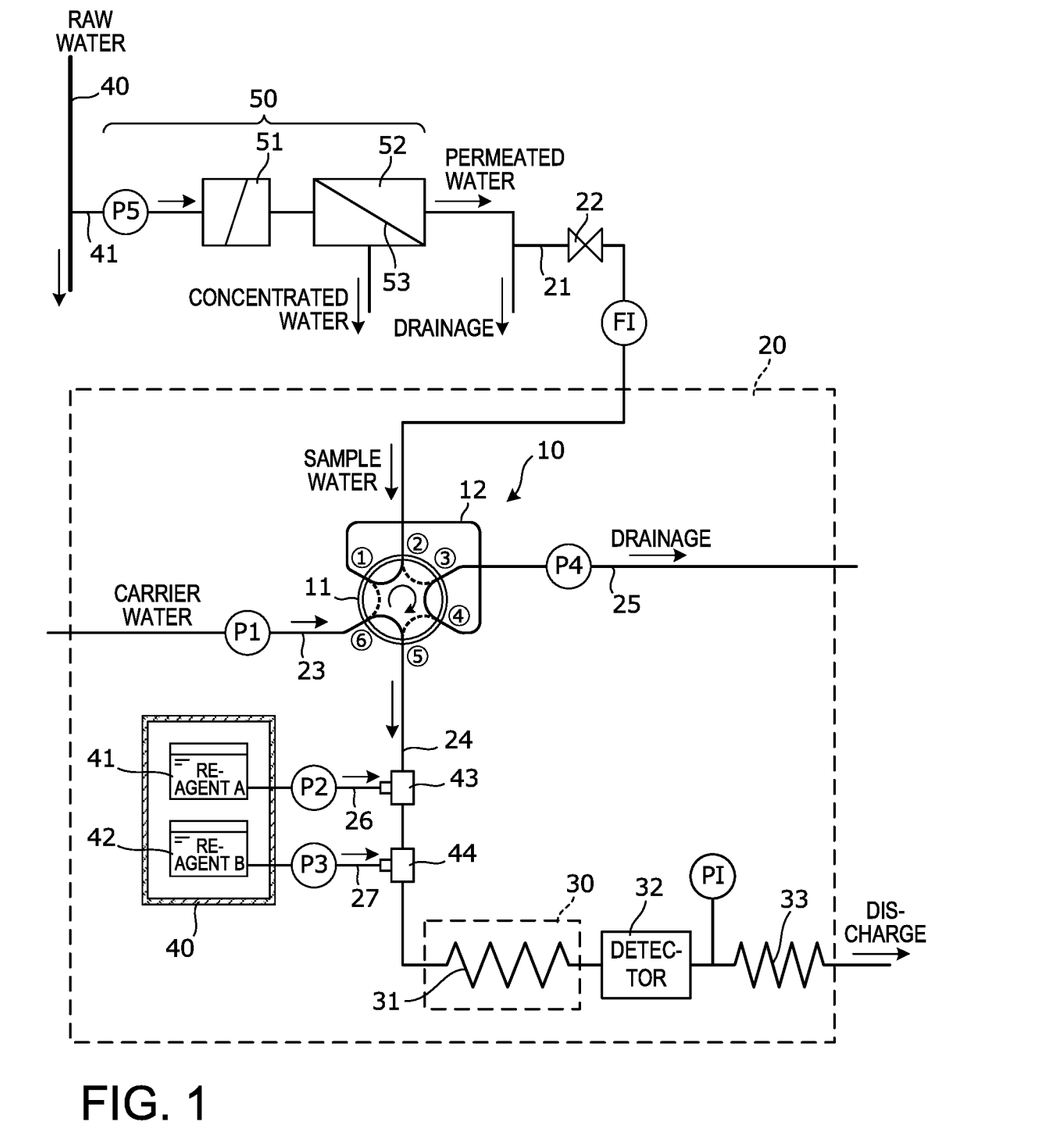
FIG. 1 is a diagram showing a configuration of an analyzing apparatus according to an embodiment of the present invention.

FIG. 1 shows a configuration of an analyzing apparatus according to an embodiment of the present invention. Here, the present invention will be described by taking as an example a case where raw water used for pure water production or pure water itself is used as sample water, and a trace amount of urea contained in the sample water is continuously quantified on-line. It is needless to say that the sample water used for the quantification of urea in the present invention is not limited to the raw water used for producing pure water. For example, the analyzing apparatus of the present embodiment can be connected to some water processing system to make the water from the water processing system a target of measurement. A pure water production apparatus is also a type of water processing system. The analyzing apparatus of the present embodiment generally comprises a pretreatment unit 50 for performing pretreatment of the sample water, and an analyzing unit 20 for analyzing and quantifying urea in the pretreated sample water.

As shown in FIG. 1, line 40 of raw water used for producing pure water is provided, and in this line 40, the raw water is fed as indicated by an arrow in the figure. Pipe 41 branched from line 40 of the raw water is provided. Pipe 41 is a pipe sending the sample water branched from the raw water to pretreatment unit 50. Pretreatment unit 50 includes: pump P5 for pumping the sample water which had been supplied to pretreatment unit 50 via pipe 41; filter 51 for removing particulate impurities in the sample water; and membrane device 52. Filter 51 is provided at the outlet of pump P5. The sample water that has passed through filter 51 is supplied to membrane device 52. Membrane device 52 includes membrane 53 that is a reverse osmosis (RO) membrane, and is configured as a reverse osmosis membrane device. Concentrated water, which is sample water having an increased impurity concentration without permeating through membrane 53, and permeated water, which is sample water having a decreased impurity concentration due to permeation through membrane 53, are discharged from membrane device 52. In the present embodiment, the pretreated sample water is the permeated water. The salt rejection rate of membrane 53, which is a reverse osmosis membrane, with regard to sodium chloride is preferably 99% or less, as will be apparent from Examples described later. The lower limit of the salt rejection rate of the reverse osmosis membrane is not particularly determined as long as it can effectively remove humic substances and the like, but is 50% or more as an example.

Sample water pipe 21 for sending the pretreated sample water to analyzing unit 20 is branched from the permeate water pipe of membrane device 52. Sample water pipe 21 is a pipe of the sample water branched from the raw water, in which on-off valve 22 and flowmeter FI are provided.

At the tip of sample water pipe 21, sampling valve 10 is provided. Sampling valve 19 is also referred to as an injector or an injection valve. The portion downstream from sampling valve 10, including sampling valve 10 itself, is analyzing unit 20. Analysis unit 20 has a configuration as a flow injection analysis (FIA) device, and performs the quantification or determination of urea in the sample water.

Sampling valve 10 is of a configuration generally used in the FIA method, and includes six-way valve 11 and sample loop 12. Six-way valve 11 is provided with six ports indicated by circled numerals in the drawings. Sample water pipe 21 is connected to port 2. Further, pipe 23 to which the carrier water is supplied is connected to port 6, pipe 25 for draining the sample water through pump P4 is connected to port 3. Sample loop 12 for collecting a predetermined volume of the sample water is connected between port 1 and port 4. One end of pipe 24 serving as an outlet of sampling valve 11 is connected to port 5. The carrier water is water substantially free of urea, for example, pure water. The carrier water is supplied to pump P1 through pipe 19, and is fed to port 6 through pipe 23 from pump P1. When performing continuous quantitation of urea, by always opening on-off valve 22 and constantly driving pump P4, the sample water is caused to flow constantly toward sampling valve 10 from sample water pipe 21.

Assuming that "(X-Y)" indicates that port X and port Y communicate with each other in six-way valve 11, six-way valve 11 is capable of switching between a first state where (1-2), (3-4), (5-6) and a second state where (2-3), (4-5), (6-1). In FIG. 1, the connection relationship between the ports in the first state is shown by a solid line, and the connection between the ports in the second state is shown by a dotted line. The carrier water in the first state flows as pipe 23→port 6→port 5→pipe 24, and flows out to a downstream side from sampling valve 10. The sample water flows as sample water pipe 21→port 2→port 1→sample loop 12→port 4→port 3, and is discharged from pipe 25. When switching from the first state to the second state, the sample water flows as sample water pipe 21→port 2→port 3, and is discharged from pipe 25, while the carrier water flows as pipe 23→port 6→port 1→sample loop 12→port 4→port 5→pipe 24, and flows out to the downstream side. At this time, the sample water that has already flowed in and filled the inside of sample loop 12 in the first state flows from port 5 into pipe 24 prior to the carrier water, and flows to the downstream side of sampling valve 10. The cubic volume of the sample water flowing into pipe 24 is defined by sample loop 12. Therefore, by repeatedly switching the first state and the second state, for example, by rotating six-way valve 11 in the illustrated arrow direction, a predetermined volume of the sample water can be repeatedly fed to pipe 24. The switching between the first state and the second state can be performed at predetermined time intervals in consideration of the residence time required for the reaction and the time until urea is detected by detector 32. Further, the switching can be performed by detecting that the sample water introduced into detector 32 is discharged from detector 32. In this manner, urea can be continuously quantified by automatically switching between the first state and the second state.

In the analyzing unit 20, the FIA method is applied to quantification of urea by a colorimetric method using diacetyl monoxime. Therefore, an acetic acid solution of diacetyl monoxime and an antipyrine-contain reagent solution are used as reaction reagents used for quantification of urea. In the following description, the acetic acid solution of diacetyl monoxime is also referred to as Reagent A, and the antipyrine-contain reagent solution is also referred to as Reagent B. Here, the case where an antipyrine-contain reagent solution is used as a reagent used in combination with diacetyl monoxime is described, but the reagent used in combination with diacetyl monoxime is not limited to an antipyrine-containing reagent solution. Reagent A and Reagent B are stored in reservoirs 41, 42, respectively.

The present inventors have found that after preparation of these reagents, the peak intensity in the absorbance measurement decreases when the reagents have been kept at room temperature for a long period of time, e.g., several days or more, for the continuous determination of urea, and that this decrease in the peak intensity can be prevented by refrigerating the reagents, in particular Reagent B (see WO 2018/186104 A). Since it is preferable that the peak intensity in the absorbance measurement does not decrease in order to perform stable quantitation, in the analyzing apparatus of the present embodiment, reservoirs 41, 42 are provided in refrigerator 40. Reagent A is prepared by dissolving diacetyl monoxime in an acetic acid solution, but when refrigerator 40 is provided, the preparation itself is performed in reservoir 41, or Reagent A is prepared and then stored in reservoir 41. Similarly, Reagent B is prepared by dissolving antipyrine in, for example, sulfuric acid, but the preparation itself is performed in reservoir 42, or Reagent B is stored in reservoir 42 after the preparation thereof. Refrigerator 40 shields reservoirs 41, 42 from light and cools reservoirs 41, 42, thereby maintaining the temperatures of Reagent A and Reagent B in reservoirs 41, 42 at 20° C. or less, preferably 3° C. or more and 20° C. or less, more preferably 5° C. or more and 15° C. or less. Reservoir 41 storing Reagent A does not necessarily have to be disposed in refrigerator 40 as long as it can be stored in a light-shielded manner. Further, it is also possible for refrigeration temperatures of the reagents to be lower than 5° C., as long as there is no crystal precipitation occurring in the reagents. With respect to a sulfonic acid solution of antipyrine in which antipyrine is dissolved in sulfuric acid, "Hygiene test method" (Non-Patent Literature 1) describes that this solution can be used for 2 to 3 months if stored in a brown bottle, and that refrigerated storage of this solution is not suitable because crystals precipitate and do not re-dissolve even when returned to room temperature. However, the present inventors experimentally confirmed that the sulfuric acid solution of antipyrine prepared according to the Hygiene test method does not crystallize at 3° C.

One end of pipe 26 is connected to reservoir 41, and the other end of pipe 26 is connected to pipe 24 by mixing portion 43. Pipe 26 is provided with pump P2 for feeding Reagent A into pipe 24 at a predetermined flow rate. Similarly, one end of pipe 27 is connected to reservoir 42, and the other end of pipe 27 is connected to pipe 24 by mixing portion 44. Pipe 27 is provided with pump P3 for feeding Reagent B into pipe 24 at a predetermined flow rate. Mixing portions 43, 44 each have a function of uniformly mixing Reagent A and Reagent B into the flow of liquid in pipe 24. The other end of pipe 24 is connected to an inlet of reaction coil 31 provided inside reaction thermostatic chamber 30. Reaction coil 31 is intended to cause a coloring reaction by urea and diacetyl monoxime in the presence of antipyrine therein, the length thereof and the flow rate inside reaction coil 31 is appropriately selected according to the residence time required for the reaction. Reaction thermostatic chamber 30 is for raising the temperature of reaction coil 31 to a temperature suitable for the reaction, and for example, heats reaction coil 31 to a temperature of not less than 50° C. and not more than 150° C., preferably not less than 90° C. and not more than 130° C.

At the end of reaction coil 31, i.e., at the outlet thereof, there is provided detector 32 for measuring the absorbance of the color generated in liquid by the coloring reaction with respect to the liquid flowing out from reaction coil 31. Detector 32 obtains, for example, the peak intensity or the peak area of the absorbance in the vicinity of a wavelength of 460 nm. The concentration of urea in the sample water can be obtained from the absorbance for the sample water by taking the absorbance when the carrier water is flowing as a baseline and obtaining a calibration curve from the absorbance for a standard solution whose urea concentration is already known. At the outlet of detector 32, back pressure coil 33 is provided which gives back pressure to the line from pump P1 through sampling valve 10, pipe 24 and reaction coil 31 to detector 32. Pressure gauge PI is connected to the position between the outlet of detector 32 and the inlet of back pressure coil 33. From the outlet of back pressure coil 33, the drainage of analyzing unit 20 configured as an FIA device flows out.

In the analyzing apparatus of the present embodiment, urea in the sample water can be measured on-line by a colorimetric method using diacetyl monoxime, using analyzing unit 20 configured as an HA device. At this time, when the sample water is passed through the reverse osmosis membrane device as a pretreatment for the sample water, as will be apparent from the Examples described later, the influence of humic substances, which are interfering substances, can be removed, and the urea can be stably quantified. Although it cannot be said that urea is not removed by the reverse osmosis membrane device, the elimination rate of urea by the reverse osmosis membrane device does not depend on the urea concentration in the sample water if the operating conditions of these membrane devices are the same. From this, it is possible to obtain the true urea concentration in the sample water by previously obtaining the urea elimination rate in membrane device 52 and correcting the urea quantitative value obtained in analyzing unit 20 based on the urea elimination rate. Filter 51 does not substantially participate in the removal of urea in pretreatment unit 50. Further, in the present embodiment, as Reagent A (acetic acid solution of diacetyl monoxime) and Reagent B (antipyrine-containing reagent solution) used in the reaction, those maintained at 20° C. or lower after preparation of these reagents can be used, particularly for Reagent B. As a result, it is possible to perform continuous quantitation of urea stably over a long period of time, as will be apparent from Examples described later.

Figure 2:
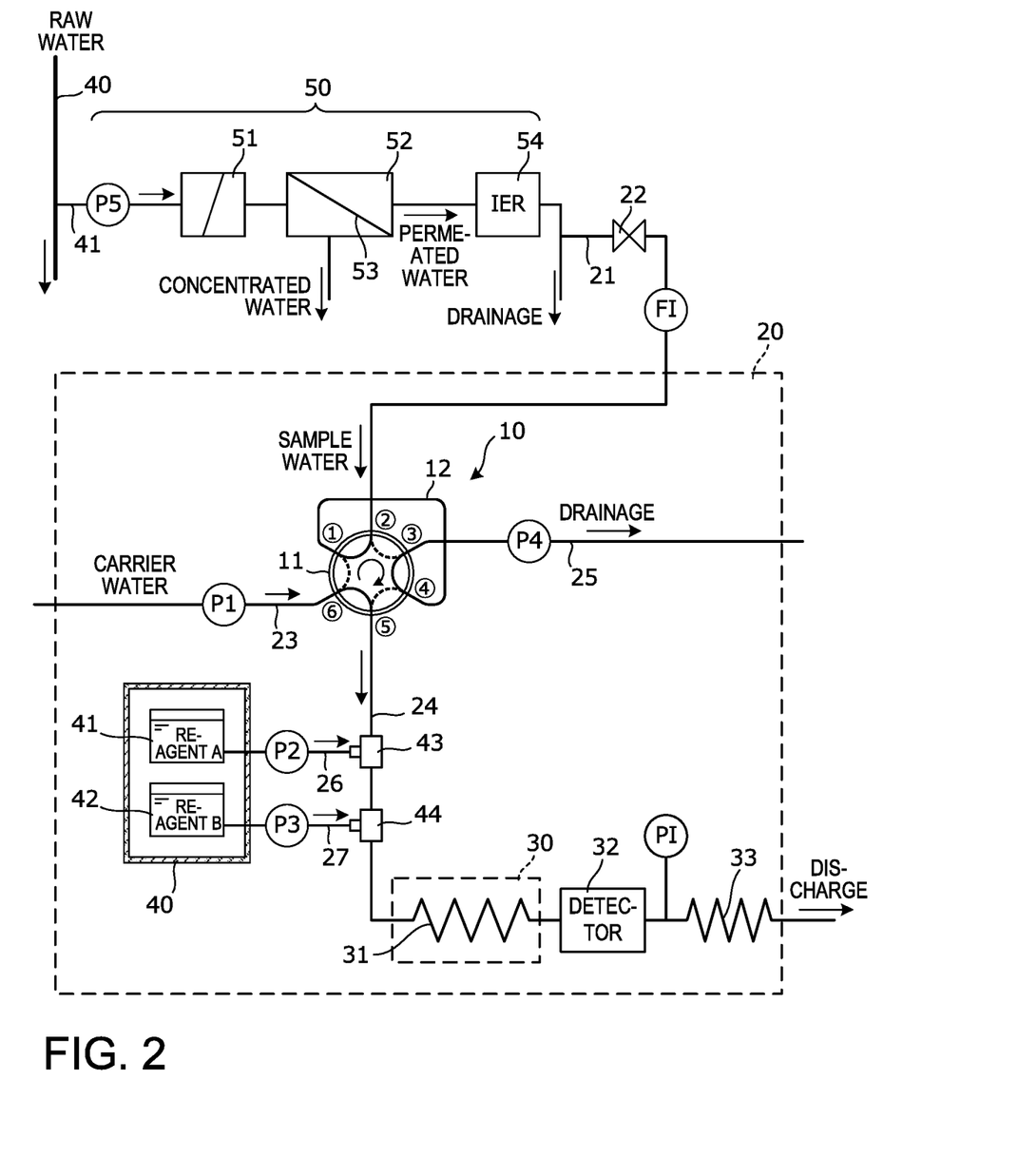
FIG. 2 is a diagram showing a configuration of an analyzing apparatus according to another embodiment of the present invention.

FIG. 2 shows an analysis apparatus according to another embodiment of the present invention. Organic nitrogen compounds that are interfere substances to the quantification of urea may not be completely removed by the reverse osmosis membrane device, depending on their molecular weight, and these organic nitrogen compounds may be included in the permeated water from membrane device 52. Therefore, in order to remove such an organic nitrogen compound, it is conceivable that an ion exchange device having at least an anion exchange resin is provided in pretreatment unit 50 in the preceding stage or the following stage of membrane device 52. The analyzing apparatus shown in FIG. 2 is an apparatus in which ion exchange device 54 having at least an anion exchange resin is provided at the following stage of membrane device 52 in the analyzing apparatus shown in FIG. 1. The permeated water from membrane device 52 passes through ion exchange device 54, and after passing through ion exchange device 54, branches to sample water pipe 21. Although it is conceivable to provide ion exchange device 54 in the preceding stage of membrane device 52, it is preferable to provide ion exchange device 54 in the following stage of membrane device 52 because, in the case where ion exchange device 54 is provided in the preceding stage of membrane device 52, the amount of water to be treated in ion exchange device 54 increases and the concentration of the component to be ion-exchanged is high, and then it is necessary to regenerate the ion exchange resin frequently. Since urea has an amino group but is nonionic, it does not substantially adsorb to at least the anion exchange resin.

Figure 3:
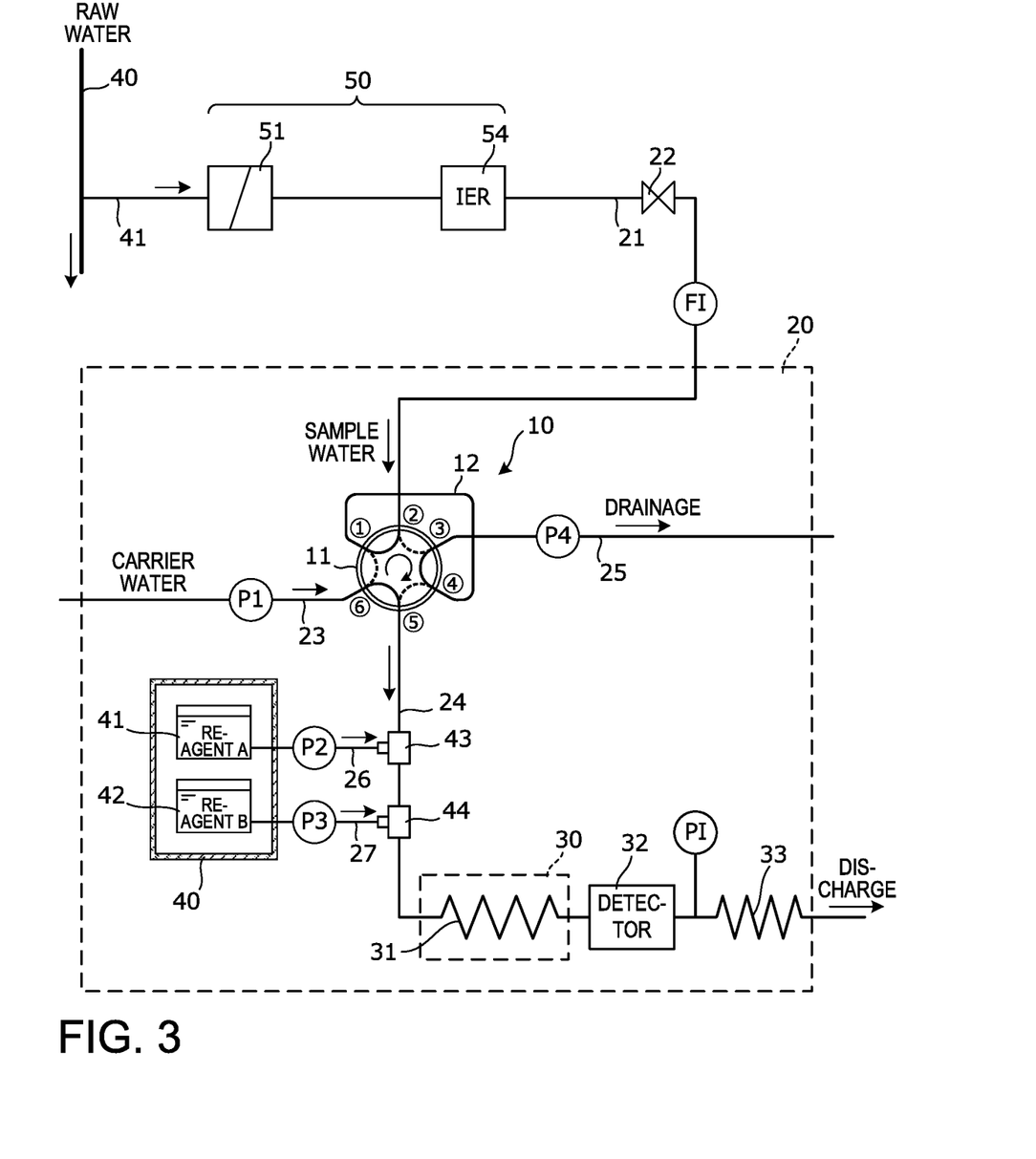
FIG. 3 is a diagram showing a configuration of an analyzing apparatus according to yet another embodiment of the present invention.

FIG. 3 shows an analyzing apparatus according to yet another embodiment of the present invention. The analyzing apparatus shown in FIG. 3 is used for the quantification of a trace amount of urea in raw water used for producing pure water. Similarly to the analyzing apparatus shown in FIGS. 1 and 2, the analyzing apparatus shown in FIG. 3 has a configuration that pretreatment unit 50 is connected to pipe 41 branched from line 40 of the raw water used for the production of pure water, and the sample water that has passed through pretreatment unit 50 is supplied to analyzing unit 20 via sample water pipe 21. On-off valve 22 and flowmeter FI are provided on sample water pipe 21. Analyzing unit 20 in the analyzing apparatus shown in FIG. 3 has the same configuration as analyzing unit 20 in the analyzing apparatus shown in FIG. 1, and is provided as an FIA apparatus.

In the analyzing apparatus shown in FIG. 3, pretreatment unit 50 is provided with filter 51 and ion exchange device 54 from the upstream side, and is not provided with a pump or a membrane device. The analyzing apparatus shown in FIG. 3 is configured such that the whole amount of the sample water that has passed through ion exchange device 54 is sent to sample water pipe 21. Of course, only a part of the sample water that has passed through ion exchange device 54 may be sent to sample water pipe 21. Filter 51 removes insoluble particles contained in the sample water. Ion exchange device 54 is a device in which an ion exchanger is disposed in a container, and is configured such that sample water passes through the ion exchanger. Ion exchange device 50 is provided to remove any interfering substances from the sample water which are contained in the sample water and which interfere with the absorbance measurement for the quantification of the target substance. Here, the target substance is urea. The ion exchanger provided in ion exchange device 50 may be only an anion exchanger or only a cation exchanger, or may be a mixed bed or a multilayered bed of the anion exchanger and the cation exchanger. The anion exchanger is, for example, at least one of a granular anion exchange resin, a monolithic anion exchange resin, and an anion exchange fiber. The cation exchanger is, for example, at least one of a granular cation exchange resin, a monolithic cation exchange resin, and a cation exchange fiber.

Here, an example of an ion exchanger provided in ion exchange device 50 has been described, but such an ion exchanger can also be used in ion exchange device 50 in the analyzing apparatus shown in each of FIGS. 1 and 2.

In pretreatment unit 50 of the analyzing apparatus shown in FIG. 3, filter 51 is provided on the inlet side of ion exchange device 50, but filter 50 may be provided on the outlet side of ion exchange device 50, that is, between ion exchange device 50 and on-off valve 22. Also in the analyzing apparatus shown in FIG. 3, urea in the sample water can be continuously measured on-line by a colorimetric method using diacetyl monoxime using the FIA method. At this time, by introducing the sample water into the FIA device after passing the sample water through the ion exchanger, even if the sample water contains any substance that may affect the absorbance measurement by detector 32, the substance is removed by ion exchanger 50, and therefore, as will be apparent from Examples described later, continuous quantitation of a trace amount of urea can be stably performed. Further, by using Reagent A (acetic acid solution of diacetyl monoxime solution) and Reagent B (antipyrine-containing reagent solution) used in the reaction, especially Reagent B, which are maintained at 20° C. or lower after preparation of these reagents, it becomes possible to perform continuous quantitation of urea stably over a long period of time.

As described above, with reference to FIGS. 1 to 3, the case where the FIA device is used as analyzing unit 20 has been described for the analysis apparatus according to the present invention. However, in the present invention, when the urea is quantified, analyzing unit 20 may be configured using an analysis mechanism other than the FIA device. That is, in the present invention, in order to remove the influence of interfering substances such as humic substances in the determination of urea regardless of the quantification method, the sample solution may be treated by at least one of a membrane device having a reverse osmosis membrane and an ion exchange device having an ion exchanger as pretreatment of the quantification of urea.

Each of the analyzing apparatuses described with reference to FIGS. 1 to 3 can also be used for microquantitative analysis using chemical species other than urea as a target substance by appropriately selecting a coloring reagent used in analyzing unit 20 configured as an HA device and a wavelength of absorbance measurement. Even in the case where a chemical species other than urea is used as a target substance, by providing pretreatment unit 50 including at least one of membrane device 52 and ion exchange device 55 in the proceeding stage of analyzing unit 20, it becomes possible to remove in advance an interfering substance with respect to the quantification of the target substance by absorbance measurement, and it becomes possible to quantify the target substance with high degree of accuracy. Since the FIA method in a non-aqueous solvent system has also been established regardless of whether the target substance is urea or not, the sample solution containing the target substance is not limited to an aqueous solution, particularly in the case where membrane device 52 is not provided in pretreatment unit 50. Although the continuous quantitation of the target substance has been described with reference to FIGS. 1 to 3, the present invention is not limited to the continuous quantitation, but is also applicable to the quantitation of the target substance such as urea in a batch system.

In the analyzing apparatuses described with reference to FIGS. 1 and 2, a reverse osmosis membrane device is used as membrane device 52. However, membrane device 52 that can be used in the analyzing apparatus according to the present invention is not limited to the one using a reverse osmosis membrane device in a narrow sense. In the present invention, a nanofiltration (NF) membrane can be used as membrane 53 if it can remove interfering substances such as humic substances and the elimination rate of the target substance such as urea is low. When a nanofiltration membrane is used as membrane 53, membrane device 52 is configured as a loose reverse osmosis membrane device. The nanofiltration membrane and the loose reverse osmosis membrane are also included in the reverse osmosis membrane referred to in the present invention.

EXAMPLES

Next, the results of experiments conducted by the inventors to demonstrate the advantageous effects of the present invention will be described. In the following description, the value of the salt rejection rate is a value with regard to sodium chloride.

Reference Example 1

Experiments were conducted to demonstrate that humic substances are interfering substances for the quantification of urea. Commercially available humic acid manufactured by Wako Pure Chemical Industries, Ltd. was dissolved in ultrapure water containing no urea under alkaline conditions to obtain sample water, and the sample water was measured by an FIA type urea analyzing apparatus which consists of analyzing unit 20 in the analyzing apparatus shown in FIG. 1. Sample water having a humic acid concentration of 0 was also measured as a blank sample. The results are given in Table 1. In Table 1, the humic acid concentration indicates the amount of carbon contained in humic acid in ppb units, and the detected urea concentration indicates the value detected by the FIA type urea analyzing apparatus as the urea concentration.

TABLE 1

| Humic acid concentration (ppb (as carbon)) | Detected urea concentration (ppb) |
|---|---|
| 0 (brank) | 0 |
| 140 | 0.6 |
| 920 | 3.9 |
| 2000 | 10.1 |

Here, the sample water does not contain urea, but if the sample water contains humic acid, humic acid interferes with the detection of urea, and a detected value as a urine degree is obtained. From Table 1, it was found that according to the FIA type urea analyzing apparatus, a peak of humic acid was detected at the same wavelength as that of urea.

Example 1

In Example 1, it is shown that by passing the sample water through a reverse osmosis membrane device as a pretreatment, it is possible to remove an interfering substance at the time of quantification of urea.

Of the analyzing apparatus shown in FIG. 1, pretreatment unit 50 and analyzing unit 20 were assembled. However, pretreatment unit 50 was not provided with filter 51. In membrane device 52, as membrane 53, reverse osmosis membrane TW30-1812, manufactured by Dow Co., salt rejection rate is 98%, was used. The raw water used in factory A was used as sample water 1, this sample water 1 was supplied to sampling valve 10 of analyzing unit 20, and the urea concentration was measured by analyzing unit 20, and then the value thereof was used as the detected urea concentration. Further, the sample water obtained by passing sample water 1 through pretreatment unit 50 was referred to as RO-treated water, and a part of the RO-treated water was separated and supplied to sampling valve 10 of analyzing unit 20 to measure the urea concentration. At this time, in pretreatment unit 50, membrane device 52 was operated under the condition of the supply pressure of 0.4 MPa, the supply water amount of 0.55 L/min and the permeated water amount of 0.25 L/min Here, since a reverse osmosis membrane is used as membrane 53, membrane device 52 is referred to as a reverse osmosis membrane device. At this time, the water recovery rate in membrane device 52 is 45%. When an urea standard solution was prepared in advance so that the urea concentration was 50 ppb, the urea standard solution was passed through membrane device 52 under the same operating conditions, and then urea was quantified by analyzing unit 20, it was found that the elimination rate of urea by membrane device 52 was 10%.

Furthermore, ion exchange resin ESP-2 made by Organo Cooperation in which strongly acidic cation exchange resin and strongly basic anion exchange resin were mixed in apparent volume ratio 1:2 in a mixed bed was filled in a container at a volume of 50 mL to form an ion exchange device. Sample water 1 was passed to the ion exchange device under the condition of 3 L/hour, i.e., SV=60, and the sample water obtained by passing through the ion exchange device was referred to as the ion exchange treated water. Also for the RO-treated water and the ion exchange treated water, urea was quantified using analyzing unit 20. The obtained result is referred to as the detected urea concentration. Apart from the quantification of urea, a total organic carbon (TOC) concentration was measured for each of sample water 1, RO-treated water, and ion exchange treated water. The results are shown in Table 2.

TABLE 2

| | Sample water 1 | RO-treated water | Ion exchange treated water |
|---|---|---|---|
| TOC concentration (ppb) | 1280 | 28 | 97 |
| Detected urea concentration (ppb) | 20 | 13 | 14 |

Further, the concentration of humic substances was measured by LC-OCD (Liquid Chromatography-Organic Carbon Detection) for each of sample water 1, the RO-treated water, and the ion exchange treated water. The results are shown in Table 3.

TABLE 3

|  | Sample water 1 | RO-treated water | Ion exchange treated water |
|---|---|---|---|
| Humic substance concentration (ppb (as carbon)) | 989 | 5 | 10 |

From Table 3, it was found that according to membrane device 52 of the present embodiment, humic substances in sample water 1 can be almost completely removed, and humic substances can also be almost completely removed by the ion exchange treatment. When the results shown in Table 2 are examined based on these facts, it is considered that the detected urea concentration of 13 ppb in the RO-treated water and the detected urea concentration of 14 ppb in the ion exchange treated water were directly the urea concentration in sample water 1. Although the urea concentration in the RO-treated water is lower, considering 10% of the urea elimination rate in membrane device 52, the value of the urea concentration in the RO-treated water and the value of the urea concentration in the ion exchange treated water are consistent in consideration of the urea elimination rate, since 13 [ppb]×1.1=14.3 [ppb]. It was found that contributions of not only urea but also the humic substances were included in 20 ppb of the detected urea concentration with respect to sample water 1.

Example 2

The urea elimination rate when the kind of membrane 53 in membrane device 52 was changed was determined. As membrane 53 provided in membrane device 52 of the apparatus of Example 1, reverse osmosis membrane XLE-440, manufactured by Dow Co., salt rejection rate was 99%, was used. An urea standard solution was prepared so that the urea concentration was 50 ppb, and the urea elimination rate was determined in the same manner as in Example 1 with the supply pressure of the membrane device 52 of 0.33 MPa, the supply water amount of 1130 L/hour and the permeated water amount of 200 L/hour. At this time, the water recovery rate in membrane device 52 is 18%. The urea elimination rate was 20%.

Example 3

As membrane 53 provided in membrane device 52 of the apparatus of Example 1, reverse osmosis membrane ES20, manufactured by Nitto Denko Co., salt rejection rate was 99.7%, was used. An urea standard solution was prepared so that the urea concentration was 50 ppb, and the urea elimination rate was determined in the same manner as in Example 1 with the supply pressure of membrane device 52 of 0.42 MPa, the supply water amount of 6700 L/hour and the amount of permeated water of 1000 L/hour. At this time, the water recovery rate in membrane device 52 is 15%. The urea elimination rate was 34%.

From the results of Examples 1 to 3, the higher the salt rejection rate of membrane 53 is, which is a reverse osmosis membrane, the higher the urea elimination rate becomes. The true urea concentration in the sample water is known by performing correction based on the urea elimination rate with respect to the detection result of urea in analyzing unit 20, but when the urea elimination rate is high, the correction error tends to be large. Therefore, the salt elimination rate of membrane 52 is preferably 99.0% or less.

Example 4

The analyzing apparatus shown in FIG. 3 was assembled. However, the portion from line 40 to flowmeter FI was not provided, and a configuration in which the sample water was supplied directly to sampling valve 10 was used. Separately, an ion exchange device filled with ion exchange resinous ESP-1, manufactured by Organo Corporation, was separately provided. This separately provided ion exchange device replaces ion exchange device 54 in the analyzing apparatus shown in FIG. 3. Ion exchange resin ESP-1 is a mixed bed ion exchange resin in which a strongly acidic cation exchange resin and a strongly basic anion exchange resin are mixed in a volume ratio of 1:1. In this example, Reagent A (acetic acid solution of diacetyl monoxime) was prepared by dissolving 2 g of diacetyl monoxime in 100 mL of 10% acetic acid, and Reagent B (antipyrine-containing reagent solution) was prepared by taking 0.2 g of antipyrine and dissolving it in 9 mol/L sulfuric acid to set the total volume to 100 mL. These reagents were stored in reservoirs 41, 42, respectively, immediately after the preparation, and the respective reagents were continuously supplied from reservoirs 41, 42 toward pipe 24.

The raw water of the ultrapure water producing apparatus in semiconductor factory B containing urea and other impurities was used as sample water A. Water obtained by passing sample water A through the above ion exchange device so that SV=10 (L/L-h), that is, the flow rate per hour becomes 10 times the volume of the ion exchange resin, is called ion exchange treated water. Water obtained by further performing urea decomposition treatment on the ion exchange treated water is called urea decomposition treated water. Sample water A, the ion exchange treated water, and the urea decomposition treated water were used as the sample waters in Example 4. The urea decomposition process was performed by adding 6 ppm of hypobromite as a urea decomposition agent to the ion exchange treated water and reacting the water at a reaction temperature of 25° C. for a reaction time of 24 hours. The urea concentration in each of these sample waters was measured using the assembled analyzing apparatus. In measuring the urea concentration, a standard solution of urea was supplied to the analyzing apparatus in advance, absorbance was measured by detector 32 to prepare a calibration curve, and the result of absorbance measurement for each sample water was applied to the calibration curve to determine the urea concentration. The results are shown in Table 4.

TABLE 4

|  | Sample water A | Ion exchange treated water | Urea decomposition treated water |
|---|---|---|---|
| Urea concentration (ppb) | 7.7 | 5.0 | <1 |

Reference Example 2

In order to examine the decomposition rate of urea in the urea decomposition process by hypobromite, urea was added to pure water containing no urea to obtain simulated water so that the concentration was 10 ppb, and further, ion exchange treated water and urea decomposition treated water were produced from the simulated water in the same manner as in Example 4. The urea concentrations were measured for the simulated water, the ion exchange treated water and the urea decomposition treated water in the same manner as in Example 4. The results are shown in Table 5.

TABLE 5

|  | Simulated water | Ion exchange treated water | Urea decomposition process treated water |
| --- | --- | --- | --- |
| Urea concentration (ppb) | 10 | 10 | <1 |

Since the measurement results of the urea concentration in the simulated water containing only urea and the ion exchange treated water agreed, it was found that urea was not removed at all by the process with the ion exchange resin. From the results of the urea decomposition treated water, it was found that urea can be removed by the decomposition treatment of urea using hypobromous acid until the urea concentration is less than 1 ppb, that is, until the urea concentration is below the detection limit.

Comparative Example 1

To sample water A in Example 4, 6 ppm of hypobromite as a urea decomposing agent was added, and the reaction was carried out at a reaction temperature of 25° C. for a reaction time of 24 hours to carry out urea decomposition process, and then the urea concentration was measured under the same conditions as in Example 4. The urea concentration after the urea decomposition treatment was measured as 2.5 ppb.

According to the results of Example 4, Reference Example 2, and Comparative Example 1, it is considered that the difference between the urea concentration detected for sample water A and the urea concentration detected for the ion exchange treated water in Example 4 is due to the contribution of some interfering substance having absorption in the vicinity of a wavelength of 460 nm and interfering with the quantification of urea by absorbance measurement. This is supported by the fact that the urea concentration can be reduced to below the detection lower limit by the urea decomposition process as shown in Reference Example 2, and that the result of Comparative Example 1 is equal to the difference between the detection results of the urea concentrations in sample water A and the ion exchange treated water in Example 4 within the measurement error range while the result of Comparative Example 1 is considered to indicate the detection result only by the components, i.e., the interfering substances, other than urea. Thus, from the results of Example 4, it was found that the interfering substances which interfere with the absorbance measurement for the quantification of urea were removed by treatment with the ion exchange resin, whereby the urea concentration measured for the ion exchange treated water was representative of the actual urea concentration for sample water A.

Example 5

As the ion exchange device in the apparatus used in Example 4, three types of devices were prepared, a device in which strongly basic anion exchange resin Amberjet® 40020H, manufactured by Organo Corporation, was filled alone, i.e., in a single bed, a device in which strongly acidic cation exchange resin Amberjet® 1024H, manufactured by Organo Corporation, was filled alone, and a device in which mixed bed resin ESP-1, manufactured by Organo Corporation, mixed with a strongly acidic cation exchange resin and a strongly basic anion exchange resin was filled. Sample water B was used as the sample water. Sample water B was raw water of an ultrapure water producing apparatus in a semiconductor factory, but is different from sample water A. The water obtained by passing sample water B through the anion exchange resin is called anion exchange treated water, the water obtained by passing sample water B through the cation exchange resin is called cation exchange treated water, and the water obtained by passing sample water B through the mixed bed resin is called mixed bed resin treated water. The urea concentration of each of sample water B, the anion exchange treated water, the cation exchange treated water, and the mixed bed resin treated water was measured in the same manner as in Example 4. The flow rate to the ion exchange device was set to SV=10 (L/L-h). The results are shown in Table 6.

TABLE 6

|  | Sample water B | Anion exchange treated water | Cation exchange treated water | Mixed bed resin treated water |
| --- | --- | --- | --- | --- |
| Urea concentration (ppb) | 9.3 | 5.3 | 7.4 | 5.3 |

It was also found from Example 5 that by using the treatment with the ion exchange resin, it was possible to remove the interfering substance having absorption in the vicinity of a wavelength of 460 nm and interfering with the determination of urea by absorbance measurement. When a strongly basic cation exchange resin is used as the ion exchange resin, it tends to be more susceptible to interfering substances than when a strongly acidic anion exchange resin or a mixed bed resin is used, and it has been found that it is preferable to use a resin containing at least an anion exchange resin as the ion exchange resin when the sample water is treated with ion exchange resin.

Example 6

Figure 4:
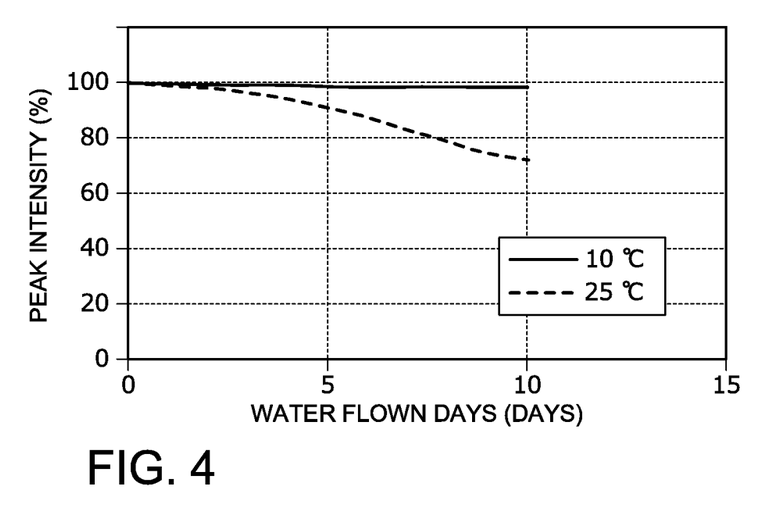
FIG. 4 is a graph showing a relation between water flown days and the peak intensity in Example 7.

The effect of refrigerating Reagents A and B was examined. In the analyzing apparatus shown in FIG. 1, the portion of analyzing unit 20 was assembled so that a standard solution prepared to have a urea concentration of 60 ppb could be continuously supplied to the sampling valve 10 as the sample water. The urea concentration of this standard solution was continuously monitored. Here, it was examined how the urea concentration obtained as the measurement value of the detection peak of the absorbance in detector 32 changes when the standard solution was continuously measured. In Example 6, Reagent A (acetic acid solution of diacetyl monoxime) was prepared by dissolving 2 g of diacetyl monoxime in 100 mL of 10% acetic acid, and Reagent B (antipyrine-containing reagent solution) was prepared by taking 0.2 g of antipyrine and dissolving it in 9 mol/L sulfuric acid to set the total volume to 100 mL. These reagents were stored in reservoirs 41, 42, respectively, immediately after the preparation, and the reagents were continuously supplied from reservoirs 41, 42 toward pipe 24. After each reagent was injected into reservoirs 41, 42 at the beginning of the continuous measurement, the reagent was not replenished during the continuous measurement. Reservoir 41 for Reagent A was maintained at ordinary temperature. Regarding Reagent B, two experiments were conducted in which the storage temperature after the preparation was set to 10° C. and 25° C. The change in the urea concentration was confirmed by the peak intensity of the absorbance at a wavelength of 460 nm. The results are shown in FIG. 4. FIG. 4 shows how the measured values when the same standard solution was measured changed as a passage of time, assuming that the peak intensity when the urea standard solution of 60 ppb was measured was 100% immediately after Reagent A and Reagent B were prepared and stored in reservoirs 41, 42, respectively.

As shown in FIG. 4, when the antipyrine-containing reagent solution (Reagent B) was maintained at 25° C., the peak intensity gradually decreased, and the peak intensity decreased to 72% during 10 days of operation for continuous measurement. That is, the quantification of urea cannot be stably performed. On the other hand, when the antipyrine-containing reagent solution was refrigerated and kept at 10° C., the peak intensity did not decrease even after continuous operation for 10 days, and it was found that continuous quantification of urea could be performed stably over a long period of time.

Example 7

Reagent B (antipyrine-containing reagent solution) was prepared in the same manner as in Example 6, and stored at 5° C., 10° C., 15° C., 20° C., and 25° C. for 10 days. After this storage, Reagent B was supplied to the apparatus of Example 6 Immediately after Reagent B was supplied to the apparatus, a standard solution having a urea concentration of 60 ppb was measured using this apparatus, and the peak intensity thereof was determined. In this case, the peak intensity when the standard solution was measured immediately after the preparation of Reagent B was set to 100%. With regard to Reagent A (acetic acid solution of diacetyl monoxime), the reagent was prepared in the same manner as in Example 6, and then stored at ordinary temperature. The results are shown in Table 7.

TABLE 7

| Storage Temperature of Reagent (° C.) | Peak Intensity (%) |
| --- | --- |
| 5 | 98 |
| 10 | 99 |
| 15 | 89 |
| 20 | 80 |
| 25 | 72 |

As shown in Table 7, the peak intensity hardly decreased when the storage temperature was 5° C. or 10° C., and the peak intensity decreased by about 10% when the storage temperature was 15° C. When stored at 20° C., the peak intensity of about 20% was decreased, and at 25° C., the peak intensity was reduced by approximately 30% of that. From these, it was found that, in order to continuously measure a trace amount of urea concentration, at least antipyrine-containing reagent solution of the acetic acid solution of diacetyl monoxime and the antipyrine-containing reagent solution which are reagents used in the reaction should be refrigerated. In that case, it was found that it is preferable to maintain the temperature of the antipyrine-containing reagent solution at 20° C. or less, further preferably maintained at 3° C. or higher and 20° C. or less, more preferably maintained at 5° C. or higher and 15° C. or less.

Example 8

The same experiment as Example 7 was performed except that Reagent A (acetic acid solution of diacetyl monoxime) of Example 7 was stored at the same storage temperature as Reagent B (antipyrine-containing reagent solution) of Example 7. When both Reagent A and Reagent B were refrigerated and measurement was performed, results similar to those shown in Table 7 (i.e., the results obtained by refrigerating only Reagent B) were obtained.

REFERENCE SIGNS LIST

10 Sampling valve;
11 Sample loop;
20 Analyzing unit:
31 Reaction coil;
32 Detector;
33 Back pressure coil;
40 Refrigerator;
41, 42 Reservoirs;
43, 44 Mixing portions;
50 Pretreatment unit;
51 Filter;
52 Membrane device;
53 Membrane;
54 Ion exchange device (IER).

The invention claimed is:

1. An analyzing method of quantifying urea in a sample solution with a urea concentration up to 50 ppb, the method comprising:
pretreating a sample solution with a membrane device including a reverse osmosis membrane; and
analyzing by quantifying urea in the pretreated sample solution directly after the pretreating,
wherein a rate of urea in the sample solution removed in the membrane device is obtained by an analyzer and a quantitative value of urea concentration detected during the analyzing is corrected based on the rate of urea removal,
wherein during the analyzing quantification of urea by flow injection analysis based on a colorimetric method, the analyzing comprises:
injecting a certain amount of the sample solution subjected to the pretreating into a carrier solution being fed to a reaction coil;
adding reagents to the carrier solution into which the sample solution has been injected to react with urea in the reaction coil; and
performing quantification of urea by measuring absorbance of liquid discharged from the reaction coil,
wherein the reagents comprise a diacetyl monoxime-containing reagent solution and an antipyrine-containing reagent solution, and wherein a temperature of the antipyrine-containing reagent solution is maintained at 5° C. or higher and 15° C. or lower after preparation of the antipyrine-containing reagent.

2. The analyzing method as claimed in claim 1, wherein the removal rate of urea in the membrane device is 20% or less.

3. The analyzing method as claimed in claim 1, wherein a salt rejection rate of the reverse osmosis membrane is 99.0% or less with respect to sodium chloride.

4. The analyzing method as claimed in claim 1, wherein a filtering process is performed on the sample solution during the pretreating.

5. The analyzing method as claimed in claim 1, wherein
the sample solution is further pretreated with an ion exchange device including an ion exchanger, and
the ion exchanger comprises at least one of a granular anion exchange resin, a monolithic anion exchange resin, and an anion exchange fiber.

6. The analyzing method as claimed in claim 5, wherein during the pretreating, the sample solution is passed through the ion exchange device provided in a preceding stage or a following stage to the membrane device.

7. The analyzing method as claimed in claim 1, wherein the sample solution pretreated by the pretreating contains humic substances.

8. An analyzing apparatus for quantifying urea in a sample solution with a urea concentration up to 50 ppb, the analyzing apparatus comprising:
pretreatment means for pretreating a sample solution; and
an analyzer for quantifying urea in the pretreated sample solution directly after the pretreating,
wherein the pretreatment means comprises a membrane device including a reverse osmosis membrane,
wherein a rate of urea in the sample solution removed in the membrane device is obtained by the analyzer, and
wherein the analyzer is configured to correct a quantitative value of urea concentration detected during analysis based on the rate of urea removal,
wherein the analyzer is a flow injection analyzer for quantifying urea in the sample solution by a colorimetric method using diacetyl monoxime, and the analyzer comprises:
a reaction coil to which a carrier solution is continuously supplied;
a sampling valve for injecting a certain amount of the sample solution that has passed through the pretreatment means into the carrier solution supplied to the reaction coil;
a feeder for adding reagents to the carrier solution to which the sample solution has been injected at a position between the sampling valve and the reaction coil; and
a detector for measuring absorbance of liquid discharged from the reaction coil,
wherein urea and the reagents are reacted in the reaction coil,
wherein the reagents comprise a diacetyl monoxime-containing reagent solution and an antipyrine-containing reagent solution,
wherein the analyzing apparatus further comprises:
a reservoir for storing at least one of the reagents, and
a refrigerator for cooling the reservoir, and
wherein a temperature of the antipyrine-containing reagent solution is maintained at 5° C. or higher and 15° C. or lower after preparation of the antipyrine-containing reagent.

9. The analyzing apparatus as claimed in claim 8, wherein the removal rate of urea in the membrane device is 20% or less.

10. The analyzing apparatus as claimed in claim 8, wherein a salt rejection rate of the reverse osmosis membrane is 99.0% or less with respect to sodium chloride.

11. The analyzing apparatus as claimed in claim 8, wherein
the pretreatment means further comprises an ion exchange device including an ion exchanger, and
the ion exchanger comprises at least one of a granular anion exchange resin, a monolithic anion exchange resin, and an anion exchange fiber.

12. The analyzing apparatus as claimed in claim 11, wherein in the pretreatment means, the ion exchange device is provided in a preceding stage or a following stage to the membrane device, and the sample solution is passed through the ion exchange device.

13. The analyzing apparatus as claimed in claim 8, further comprising a filter through which the sample solution passes in the pretreatment means.

14. The analyzing apparatus as claimed in claim 8, wherein the sample solution pretreated by the pretreating means contains humic substances.

* * * * *